United States Patent
Reichel et al.

(10) Patent No.: US 9,442,489 B2
(45) Date of Patent: Sep. 13, 2016

(54) METHOD FOR COORDINATING THE OPERATION OF MOTOR VEHICLES THAT DRIVE IN FULLY AUTOMATED MODE

(71) Applicant: AUDI AG, Ingolstadt (DE)

(72) Inventors: Michael Reichel, Ingolstadt (DE); Andreas Siegel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/438,972

(22) PCT Filed: Oct. 24, 2013

(86) PCT No.: PCT/EP2013/003200
§ 371 (c)(1),
(2) Date: Apr. 28, 2015

(87) PCT Pub. No.: WO2014/067638
PCT Pub. Date: May 8, 2014

(65) Prior Publication Data
US 2015/0286219 A1    Oct. 8, 2015

(30) Foreign Application Priority Data
Oct. 29, 2012  (DE) .................. 10 2012 021 282

(51) Int. Cl.
*G05D 1/02*        (2006.01)
*G08G 1/0965*     (2006.01)
*G08G 1/16*        (2006.01)

(52) U.S. Cl.
CPC .......... *G05D 1/0289* (2013.01); *G08G 1/0965* (2013.01); *G08G 1/162* (2013.01)

(58) Field of Classification Search
USPC ......... 701/23, 25, 301, 2, 26, 300, 411, 422, 701/423, 515; 340/961
See application file for complete search history.

(56) References Cited

U.S. PATENT DOCUMENTS

| | | | |
|---|---|---|---|
| 6,151,539 A | 11/2000 | Bergholz et al. | |
| 6,292,725 B1 * | 9/2001 | Kageyama | G05D 1/027 180/169 |

(Continued)

FOREIGN PATENT DOCUMENTS

| | | |
|---|---|---|
| DE | 689 25 559 | 9/1996 |
| DE | 102 00 002 | 8/2002 |

(Continued)

OTHER PUBLICATIONS

International Search Report issued by the European Patent Office in international Application PCT/EP2013/003200.

(Continued)

*Primary Examiner* — Thomas Tarcza
*Assistant Examiner* — Richard Goldman
(74) *Attorney, Agent, or Firm* — Henry M. Feiereisen LLC

(57) ABSTRACT

In a method for coordinating operation of motor vehicles driving fully automated, a trajectory described by a driving intervention is determined for each motor vehicle from status information of the motor vehicle, whereafter it is determined by an on-board vehicle system whether a coordination condition exists that requires coordination. If a coordination condition exists, trajectory data describing the trajectory are exchanged between the motor vehicles via a communication link through an on-board communication device and the trajectory is checked for conflicts caused by spatial and temporal overlap of the trajectories of at least two motor vehicles and/or because at least one of the motor vehicles did not reach its destination. If a conflict exists, the trajectory of a motor vehicle participating in the conflict is adjusted based on an arbitration rule evaluated by an arbitration device, whereafter the driving interventions described by the trajectory are performed by each motor vehicle.

20 Claims, 5 Drawing Sheets

(56) References Cited

U.S. PATENT DOCUMENTS

| | | | | |
|---|---|---|---|---|
| 6,625,540 | B2* | 9/2003 | Kageyama | B60W 40/04 701/301 |
| 6,718,236 | B1* | 4/2004 | Hammer | G08G 5/0008 342/36 |
| 7,395,151 | B2* | 7/2008 | O'Neill | G06Q 10/06 340/988 |
| 7,734,386 | B2* | 6/2010 | DelNero | G05D 1/0088 244/152 |
| 8,489,281 | B2 | 7/2013 | Reichel | |
| 8,781,727 | B1* | 7/2014 | Bonawitz | G05D 1/104 701/410 |
| 8,825,265 | B1* | 9/2014 | Ferguson | G05D 1/0212 701/23 |
| 8,892,293 | B2 | 11/2014 | Reichel | |
| 2002/0143461 | A1* | 10/2002 | Burns | G08G 1/207 701/117 |
| 2004/0068348 | A1 | 4/2004 | Jager | |
| 2006/0271252 | A1* | 11/2006 | Hori | G08G 1/20 701/23 |
| 2007/0021879 | A1* | 1/2007 | DelNero | G05D 1/0088 701/23 |
| 2008/0161986 | A1* | 7/2008 | Breed | G08G 1/161 701/23 |
| 2008/0316052 | A1* | 12/2008 | Ruffini | H04W 28/18 340/901 |
| 2009/0118875 | A1* | 5/2009 | Stroud | G01S 5/0027 701/3 |
| 2009/0125204 | A1* | 5/2009 | Kudo | B62D 15/026 701/96 |
| 2009/0287376 | A1* | 11/2009 | Aso | B60W 10/12 701/42 |
| 2010/0042269 | A1* | 2/2010 | Kokkeby | G01S 3/7864 701/3 |
| 2010/0094499 | A1* | 4/2010 | Anderson | G05D 1/0295 701/23 |
| 2010/0114633 | A1* | 5/2010 | Sislak | G06Q 10/047 701/120 |
| 2010/0131121 | A1* | 5/2010 | Gerlock | G08G 5/0013 701/2 |
| 2010/0134320 | A1* | 6/2010 | Chevion | G08G 1/164 340/932 |
| 2010/0324771 | A1* | 12/2010 | Yabushita | G05D 1/024 701/25 |
| 2011/0106341 | A1* | 5/2011 | Kinoshita | G05D 1/0289 701/2 |
| 2011/0130954 | A1* | 6/2011 | D'Andrea | G05B 19/41895 701/532 |
| 2012/0143488 | A1* | 6/2012 | Othmezouri | B60T 7/22 701/301 |
| 2012/0185123 | A1* | 7/2012 | Ansari | G05D 1/0276 701/25 |
| 2013/0018528 | A1* | 1/2013 | Kelly | B60T 7/22 701/2 |
| 2013/0060456 | A1* | 3/2013 | Pourparhizkar | G08G 1/22 701/117 |
| 2013/0238170 | A1* | 9/2013 | Klinger | G05D 1/104 701/3 |
| 2013/0325306 | A1* | 12/2013 | Caveney | B60W 30/0953 701/117 |
| 2014/0005880 | A1* | 1/2014 | Guenkova-Luy | H04L 41/069 701/31.4 |
| 2014/0046506 | A1 | 2/2014 | Reichel | |
| 2014/0081505 | A1* | 3/2014 | Klinger | G08G 1/162 701/25 |
| 2014/0136414 | A1* | 5/2014 | Abhyanker | G06Q 50/28 705/44 |
| 2015/0106010 | A1* | 4/2015 | Martin | G01C 21/34 701/410 |
| 2015/0142248 | A1* | 5/2015 | Han | G01C 21/3602 701/23 |
| 2015/0149022 | A1* | 5/2015 | Harvey | E04H 6/422 701/23 |
| 2015/0286219 | A1* | 10/2015 | Reichel | G08G 1/0965 701/23 |

FOREIGN PATENT DOCUMENTS

| | | |
|---|---|---|
| DE | 101 44 751 | 3/2003 |
| DE | 103 10 501 | 9/2004 |
| DE | 103 34 203 | 3/2005 |
| DE | 10 2004 021 186 | 12/2005 |
| DE | 10 2009 022 281 | 3/2010 |
| DE | 10 2009 058 092 | 6/2011 |
| EP | 0 913 751 | 9/2003 |
| EP | 0 988 508 | 10/2003 |
| WO | WO 02/056276 | 7/2002 |
| WO | WO 02/082195 | 10/2002 |

OTHER PUBLICATIONS

Patrick A. O'Donnell et al., Deadlock-Free and Collision-Free Coordination of Two Robot Manipulators; Cambridge, MA; 1989.

Markus Jäger, et al., Decentralized Collision Avoidance, Deadlock Detection, and Deadlock Resolution for Multiple Mobile Robots; Maui, Hawaii; 2001.

\* cited by examiner

METHOD FOR COORDINATING THE OPERATION OF MOTOR VEHICLES THAT DRIVE IN FULLY AUTOMATED MODE

CROSS-REFERENCES TO RELATED APPLICATIONS

This application is the U.S. National Stage of International Application No. PCT/EP2013/003200, filed Oct. 24, 2014, which designated the United States and has been published as International Publication No. WO 2014/067638 A2 and which claims the priority of German Patent Application, Serial No. 10 2012 021 282.8, filed Oct. 29, 2012, pursuant to 35 U.S.C. 119(a)-(d).

The invention relates to a method for coordinating the operation of motor vehicles that drive in fully automated mode.

In modern motor vehicles, the importance of driver assistance systems, such as longitudinally-guiding driver assistance systems (especially ACC systems, "adaptive cruise control") or transverse-guiding driver assistance systems (in particular LKA systems, "lane keep assist") continuously increases. Through further development of these systems, an increased use of motor vehicles that drive autonomously or in fully automated mode can be expected in the medium term. Vehicles capable of driving autonomously in tight spaces are in development, however only under supervision and in each case operating as the sole system. A first application of several fully automatic motor vehicles driving autonomously or in fully automated mode may be the introduction of autonomous or fully automated parking in specially designated areas.

The terms driving autonomously and driving in fully automated mode are used interchangeably for driving a motor vehicle without having a driver directly monitoring the driving. The designation as fully automated driving is in accordance with the designation and classification of automated driving functions (as of Jun. 9, 2010) introduced by the Federal Highway Research Institute (BASt).

Vehicles driving autonomously or in fully automated mode offer many advantages. For example, traffic congestion and accidents can be avoided through perfect adjustment of the driving behavior. Vehicles driving autonomously or in fully automated mode are expected to be initially used in confined areas, for example when autonomously parking in a parking garage.

When driving autonomously or in fully automated mode, a trajectory is typically determined independently for each vehicle from the information present in the vehicle. While this works well in relatively open areas and in low-density traffic situations, other situations that cannot be resolved at all or only very slowly can easily arise at a high vehicle density and when trajectories are determined independently. To be able to fully utilize the advantages of driving autonomously or in fully automated mode, such as improved traffic flow and a higher vehicle density, the behavior of other vehicles driving autonomously or in fully automated mode must be considered.

Such consideration is particularly important when a high vehicle density exists in a confined space, such as in a parking garage, or when unforeseen driving situations occur, such as a disabled vehicle at a narrow location. With previous methods, this aspect was taken into account by detecting movement of the other vehicles, utilizing suitable sensors. However, this may in the aforedescribed situations cause a so-called deadlock, i.e. a situation where none of the vehicles can perform the desired movement, or situations that can be resolved only very slowly.

SUMMARY OF THE INVENTION

It is therefore the object of the invention to provide an improved method for controlling the operation by motor vehicles that drive autonomously or in fully automated mode.

To attain this object, a method of the aforementioned type is provided, with the following steps:
Determining with a vehicle system of the motor vehicle for each motor vehicle a trajectory describing at least one driving intervention from ego-information describing the condition of the vehicle including a destination, and environmental information describing the environment of the motor vehicle,
Determining with the vehicle system of the automobile whether at least one coordination condition indicating a necessary coordination exists,
When the coordination condition or at least one of the coordination conditions exists, performing the following steps:
Exchanging trajectory data that describe the trajectory via a communication link by an on-board communication device of each motor vehicle,
Checking the trajectory of the vehicles for conflicts that exist when the trajectories of at least two of the vehicles spatially and temporally overlap and/or when at least one of the vehicles fails to reach its destination,
when there is a conflict:
Adapting the trajectory at least one motor vehicle involved in the conflict based on at least one arbitration rule, which is evaluated by an arbitration device, and
Executing with each motor vehicle the driving interventions described by the respective trajectory.

The method according to the invention is based on two key ideas: On the one hand, in situations where coordination of movements of the motor vehicles is useful or necessary, i.e. when a coordination condition exists, the trajectory data are exchanged between the motor vehicles and the arbitration device, wherein the arbitration device may also be or include a vehicle system. It is then not only possible to judge a currently recognized driving maneuver, but the driving maneuvers planned for the future can also be included in trajectory calculations. On the other hand, the at least one trajectory is adapted with the method according to the invention based on an arbitration rule, which is evaluated on an arbitration device. This is significant, because different vehicles can then use different sets of rules for determining trajectories. However, even in a situation where all the vehicles involved in a conflict want to recognize and prevent such a conflict, the different prevention strategies can still lead to new conflicts. This problem is avoided when all necessary trajectory adaptations are performed by an arbitration device based on a rule set.

Usually, the individual motor vehicles will in most driving situations use the known functions for determining trajectories when driving autonomously or in fully automated mode. The trajectories of the motor vehicles are thus determined individually for each vehicle by taking into account the ego-information and environmental information present in the vehicle system. The method according to the invention for coordinating the operation of motor vehicles driving in autonomous or fully automated mode thus differs from conventional methods for motor vehicles driving autonomously or in fully automated mode only in special driving situations where, as described above, a coordination of the movements of motor vehicles is useful or necessary.

One of such driving situation is a so-called "deadlock", i.e. a driving situation that cannot be resolved when the trajectories of the individual motor vehicles are independently determined because the vehicles are blocking each other. The same applies to situations where it can be determined that a situation can be resolved only very slowly without coordination of the movements of the motor vehicles. However, it is also possible that a vehicle system determines a trajectory that although beneficial for that vehicle would necessitate coordination with other motor vehicles. In this situation, the vehicle system of the motor vehicle can initiate execution of a method according to the invention. In situations where a large number of motor vehicles operate in a confined space, the method according to the invention can generally be utilized in certain areas.

With this method, a trajectory is first determined, which may be done in a conventional manner; however, desired trajectories may also be determined which cannot be executed without cooperation between motor vehicles. The trajectory is determined in the vehicle system of the motor vehicle. Predominantly sensor information, but also environmental information from other sources and ego-information, is used to determine the trajectory. The trajectory describes a planned route to a predetermined destination. The planned route need not be devoid of other motor vehicles and their predicted trajectories, especially when the trajectory is a desired trajectory. In this case, conflicts occur that will be resolved in the course of the method according to the invention.

Different strategies can be used for determining the trajectories. For example, particularly gentle and energy-efficient driving may be contemplated, but also a driving style intended to reach the destination as quickly as possible. Accordingly, the other vehicles are considered differently. The strategies can be defined in different ways. For example, a strategy may be randomly selected or specified by an operating element.

After the determination, it is checked whether coordination between motor vehicles is useful or necessary for quickly reaching the destination of the motor vehicles, i.e. whether a coordination condition exists. Coordination between motor vehicles is advantageous especially in situations where many vehicles driving autonomously or in fully automated mode operate in a confined space. Several methods can be used for determining coordination conditions which will be explained in more detail below. However, it should already be mentioned here that coordination is particularly advantageous when a trajectory has been determined that is not possible without changing a position or a movement predicted by the vehicle system of at least one of the other motor vehicles. The method may be initiated in particular by a single vehicle, by a plurality of motor vehicles and/or by a central facility.

In the absence of a coordination condition, the motor vehicles carry out the driving interventions of the trajectories of the individual vehicles. It will be understood that, as in conventional methods, the trajectory is continuously checked and if necessary adjusted, especially newly calculated, in particular by taking into account safety aspects.

When the existence of a coordination condition is determined, the determined trajectory is transmitted to at least one motor vehicle participating in the process or to the arbitration device. The motor vehicles participating in the process can be determined in a number of ways. In the simplest case, these vehicles are determined by the vehicle system of a motor vehicle that initiates the coordination process. It is also possible that, for example, all motor vehicles within a certain area participate in this process. In particular, this may be an area that is designated for driving autonomously or in fully automated mode. For example, parking lots or parking garages, but also certain streets or sections of streets can be opened for operating motor vehicles autonomously or in fully automated mode. In this case, it may be useful to include in the process all motor vehicles in this area.

The trajectory may be transmitted via a vehicle-to-vehicle communication (car2car communication) or via a vehicle-to-infrastructure communication (car2x communication). In order to enable the interpretation of the trajectory data of another vehicle, these data should be in a defined format. In the simplest case, this may be a list of driving interventions with associated time intervals. However, this trajectory may also be forwarded as a list of location information. Driving interventions, locations and times may also be transmitted with a tolerance interval, resulting in a "trajectory volume" for the motor vehicle that is occupied by this vehicle.

After the trajectory data have been transmitted, it can be checked in each of the motor vehicles or by the arbitration device, whether a conflict exists between the trajectories. A conflict exists especially when the distance between two vehicles is at any point of the trajectory smaller than the size of vehicles and, if appropriate, a safety margin. The safety margin can also be adapted to the driving conditions and/or the environmental conditions. When such conflict exists, there would be the risk of collision when the motor vehicles move along these trajectories. A conflict may also be detected when at least the trajectory of at least one motor vehicle does not reach the destination. In both cases, it is necessary to adjust the trajectory of at least one motor vehicle.

In this case, the trajectory of the at least one motor vehicle is adjusted with the method of the invention by evaluating with an arbitration device at least one arbitration rule. To adjust the trajectory of the at least one motor vehicle, the trajectory of the motor vehicles and environmental information and, when available, ego-information of the motor vehicles are used as input data for the arbitration rule. In particular, the arbitration rule includes a priority determination for the motor vehicles and rules for trajectory determination. Output data which include at least one adjustment of the trajectory of at least one motor vehicle are generated by applying the arbitration rules to the input data.

A number of approaches are possible for selecting the arbitration device or the arbitration rule, as will be discussed in more detail hereinafter. The decisive factor is the use of a set of rules for resolving the conflict. Various sets of rules can be envisioned. For example, in one optimization, the individual motor vehicles may be driven to the destination as quickly as possible; conversely, in another solution, the least amount of time for all motor vehicles may be achieved. Arbitration rules may also include conflict resolution rules, such as a right-before-left rule at intersections. A number of approaches exist for solving this type of route detection problem with a plurality of participants, wherein the employed algorithms are continuously improved. Therefore, the arbitration rules will not be described here in detail and the examples given are illustrative only of the principle.

The arbitration rules may be stored in the arbitration device itself. The arbitration rules may also be stored on another system and loaded from the arbitration device, for example, via a vehicle-to-infrastructure communication device. Loading can take place already at the start of the arbitration device or only when a conflict occurs. When the arbitration device is a vehicle system, a rule set applying to this area may be loaded when entering an area that is designed for driving autonomously or in fully automated mode.

When the arbitration device finds adjustments for at least a trajectory based on at least one arbitration rule that resolve the conflict, the at least one adjusted trajectory is transmitted to the associated motor vehicles via communications devices. The associated motor vehicles then perform the driving interventions of the adjusted trajectories. The execution of the trajectories can either be continuously monitored so that deviations from the trajectories that result in a solution to the conflict can be corrected, or the process is terminated after the adjusted trajectories are transmitted. If deviations from the given trajectories occur in the second case, one of the motor vehicles can, if required, initiate once more an exchange of trajectory data and arbitration.

Coordination between motor vehicles may be useful in many cases. Thus, the coordination condition or one of the coordination conditions may be a determination of a blockade condition by the vehicle system indicating a blockade, wherein when a blockade condition exists, the vehicle system is configured in particular for determining a trajectory that cannot be executed according to the environmental information without changing a position or a movement of at least one of the other motor vehicles predicted by the vehicle system. A blockade condition generally exists in cases where the vehicle system can determine that another vehicle at least partially blocks a desired trajectory of the own motor vehicle. In particular, a blockade condition is present when driving autonomously or in fully automated mode does not terminate at the specified destination at all or only very slowly without arbitration. In this case, it is advantageous to already transmit to the other motor vehicles a desired trajectory for the own vehicle. This is not immediately feasible, since the individual positions or predicted movements of other vehicles are not taken into account; however, a desired outcome of the arbitration can be specified.

This will now be explained with reference to an exemplary intersection, toward which two motor vehicles drive. If all actual environmental information, including the predicted trajectory of the respective other motor vehicle, are included in determining the trajectories of the motor vehicles, then both vehicles should slow down to avoid a collision, unless one vehicle has the right of way. In this case, both vehicles would have to wait until the other vehicle has passed the intersection, which would cause both vehicles to permanently stop. If at least one vehicle system of one of two vehicles determines after the stop of vehicles that blockade condition indicating a blockade exists, then this is a coordination condition which results in an exchange of the trajectories of the motor vehicles, a check of the trajectories for conflicts, wherein a conflict occurs because none of the vehicles reaches its destination, and arbitration.

A number of conditions blockade can be used by the vehicle system of one of the motor vehicles to confirming a blockade. In the simplest case, the blockade condition or one of the blockade conditions is a repeated determination of a trajectory that does not reach the destination over a predetermined or predeterminable period of time. Classic "deadlocks" are reliably identified with this condition, since no trajectory leading to the destination can then be calculated. However, this condition does not detect traffic situations that recur periodically or blockades that can be resolved only very slowly. Therefore, such traffic situation can also not be resolved through arbitration.

However, the blockade condition or one of the blockade conditions may also indicate that within a predetermined or predeterminable time interval, a distance between the motor vehicle and the destination is never smaller than a smallest distance between the motor vehicle and the destination before the beginning of this time interval. With such a blockade condition, in particular cyclical, periodically recurring traffic situations are detected.

Alternatively or in addition, the blockade condition or one of the blockade conditions may also represent a temporal or spatial deviation from an ideal trajectory that is greater than a predetermined or predeterminable temporal or spatial variation, wherein the ideal trajectory is calculated by disregarding at least one motor vehicle. With this blockade condition, for example, large-scale detours or long waiting times can be avoided that would otherwise not perceived as a blockade.

Advantageously, the vehicle system may also be configured to determine trajectories, which according to the, environmental information cannot be executed without changing a position or a movement of at least one of the other motor vehicles predicted by the vehicle system.

For example, when the vehicle system calculates that the destination can be reached more quickly on a trajectory that does not take into consideration a position or a movement of one of the other vehicles predicted by the vehicle system, then such a trajectory can be used. Since such a trajectory cannot be directly executed when considering safety aspects, this trajectory should be exchanged with the other vehicles after this trajectory has been determined. This represents a coordination condition. The vehicle systems can thus determine that a conflict exists and arbitration can take place. In many cases, the overall trajectory for the motor vehicles can be improved as a result of the arbitration. It should be noted that with the method according to the invention trajectories are executed in the presence of a coordination condition only after checking the trajectories for the presence of conflicts and, if necessary, after changing at least one trajectory through arbitration and hence elimination of the conflict.

Coordinated driving can often cause the vehicles to arrive much faster at the destinations, in particular in traffic situations where a plurality of vehicles driving autonomously or in fully automated mode operate in confined spaces. The coordination condition or one of the coordination conditions may hence indicate that the motor vehicle is an area designed for coordinated driving, wherein the vehicle device is configured in particular to use data from a position determining device and/or from the communication device for determining that the motor vehicle is such area designed for coordinated driving.

In this case, potential conflicts, including conflicts that include a plurality of vehicles, can be identified and resolved early. In particular, a central facility may be provided in an area designed for coordinated driving, which checks the trajectories of the vehicles for conflicts and adjusts the trajectories of motor vehicles, if necessary.

A number of different systems can be used in the method according to the invention as arbitration device. Advantageously, the arbitration device is the vehicle system of a motor vehicle, in particular of a motor vehicle involved in a conflict, and the trajectory data of the at least one adjusted trajectory are transmitted by the vehicle's own communication device to the motor vehicle associated with the trajectory. In this case, no additional infrastructure is required to perform the method according to the invention. Modern motor vehicles usually have vehicle systems with sufficient computing power to solve complex problems. This allows the calculation of the adaptation of the at least one trajectory directly with the vehicle system of one of the motor vehicles involved in the conflict. When the vehicles are also equipped with devices for vehicle-to-vehicle communication, the process of the invention can be executed at any time and at any location, when a conflict between the trajectories of two or more motor vehicles occurs.

If as previously described, when a vehicle system of one motor vehicle, in particular a motor vehicle involved in the conflict, is used to determine the adjustment of the at least one trajectory, this vehicle system must be clearly identified. In the simplest case, the vehicle whose vehicle system is the arbitration device can be determined randomly. For example, the vehicle systems of all vehicles involved in the conflict can generate random numbers, with the vehicle system having determined the largest or the smallest number being selected as the arbitration device. Other random determinations are conceivable.

However, determination information to determine the motor vehicle whose vehicle system is the arbitration device, in particular priority information, may be transmitted by the communication device of at least one of the vehicles. It is then possible to generally assign vehicle systems of certain motor vehicles, in particular of support vehicles such as tow trucks or ambulances, as the arbitration device. In this situation, a particular arbitration rule is used, which ensures that the support vehicle reaches the operation site particularly quickly. However, for example, vehicles may also transmit the capability of their vehicle systems. In this case, the most dominant vehicle system may be assigned as the arbitration device, so that more complex adjustments to routes may be feasible to achieve an optimal result, or to calculate trajectory adaptations more quickly. Also, the vehicle system with the best environmental information may be assigned as the arbitration device by transmitting determination information.

Alternatively, the arbitration device may be a central computing system, wherein the central computing system includes a communication device or is connected thereto via a communication network that communicates with the communication devices of the at least two vehicles, and wherein the trajectory data of the at least one adjusted trajectory are transmitted via this communication device to the motor vehicle associated with this trajectory. Such central computing systems may be provided especially in areas designed for driving autonomously or in fully automated mode. A central computing system as arbitration device is basically neutral, i.e. there is no preference for a motor vehicle due to the selection of the arbitration device. Furthermore, a rule set is always used by a central computing system, i.e. new conflicts caused by conflicting arbitrations cannot arise within a short time interval. By using a central computing system, a central computing system can advantageously determine information independently and has potentially the best model of the overall traffic situation. Conflict situations can be reliably resolved especially in controlled environments, such as in a parking garage. Alternatively, however, a central computing system may be responsible for large areas and the motor vehicles may contact the central computing system in the event of conflicts between trajectories, for example by mobile phone. The use of a central computing system as arbitration device also has the advantage that human personnel can be used directly in complex situations to resolve these situations. For example, when a disabled vehicle causes a traffic situation in a parking garage where no adjustment of at least one trajectory is possible which would allow vehicles to reach their destination, a central computing system can notify a human employee who then removes the disabled vehicle. Alternatively, such a central computing system may also fall back on an automatic system, such as automatic towing systems.

However, an arbitration device may also be designed as a decentralized network that includes the particular vehicle systems of those motor vehicles that are involved in a conflict, or that includes the vehicle systems of all motor vehicles. The arbitration rules between motor vehicles can then, for example, be reconciled. Individual rules can be determined by a majority vote or at random. The vehicle systems of individual motor vehicles may also propose trajectory adaptations, wherein the vehicle systems of other motor vehicles may accept or reject these proposals. A distributed computation of conflict resolution is also possible. This approach makes more computing power available, so that complex conflicts can be resolved more quickly.

In particular, the vehicle system of at least one of the vehicles may determine desired trajectories for at least one other vehicle, which can then be exchanged via the decentralized network. This is especially important in traffic situations where solutions with bilateral advantage exist. Examples are a common reset when forward travel is not possible due to a disabled vehicle or a situation where a motor vehicle requires more space for leaving a parking space, while the other vehicle wishes to move into the vacant parking space.

Since with the method according to the invention, an arbitration device shall make all necessary adjustments of trajectories, while individual vehicles may have environmental information or other information that is not available to the arbitration device, it is advantageous when at least one vehicle information is transmitted via the communication device of at least one of the vehicles, in particular a position of the vehicle, the destination which the motor vehicle should reach, in particular within a time window, information for possible driving that describes possible driving maneuvers, and/or priority information to be used as an input variable for the arbitration rule for adapting the at least one trajectory.

For resolving a dispute, most detailed information about the individual vehicles involved in the conflict is useful. For example, information about possible turning radii of individual vehicles or a maximum achievable acceleration may be transmitted. Priority information may also be used for adapting trajectories. For example, trajectories may be adjusted so that support vehicles such as tow trucks or ambulances arrive quickly at their operating site. Even "quality of service" information is conceivable. This would allow, for example, enabling a faster arrival or departure in parking garages with payment of an additional fee. The transmitted vehicle information may also include information whether individual motor vehicles should reach their destination particularly fast or particularly energy-efficiently.

The best possible adaptation of the at least one trajectory is possible only with a sufficiently complete environment model. Therefore, at least one item of environmental information may be transmitted by the communication device of at least one of the motor vehicles, in particular at least one determined position of a vehicle or of an obstacle. This can occur, in particular, directly through sensor information.

In some situations, it may be impossible to adjust the at least one trajectory based on the at least one arbitration rule that allows the motor vehicles to reach their destinations. In this case, a determination can be made with another arbitration device, wherein the other arbitration device is in particular a vehicle system of a motor vehicle that has thus far not participated in the arbitration process, or a central facility. This allows multi-step processes. For example, initially an attempt may be made to arrive at a result on an equal footing in a decentralized network composed of the vehicle systems of the motor vehicles involved in the conflict. Since this process is relatively complex, no solution may be found in a given time interval. In this case, the vehicle device of one of the participating vehicles may be designated as the arbitration device. If no solution is found here, then the arbitration can be handed over to a central facility or to an uninvolved vehicle.

In the case where adjustment of the at least one trajectory based on the at least one arbitration rule to reach the destination of the vehicles is not possible, an alarm device may be activated that notifies a person by way of an acoustic signal, a visual signal or a communication network. Such a situation may arise, for example, when resolution of a conflict is actually impossible regardless of the trajectories, for example, when a vehicle breaks down at a narrow passage. However, complex situations may also arise where a predetermined algorithm does not produce a solution within a predetermined time interval. In such case, human intervention may be helpful for aiding in a more flexible adaptation to the situation.

If the at least one arbitration rule is incapable of reaching the destination of vehicles by adapting the at least one trajectory, the motor vehicles may be stopped. Continuing the operation of the motor vehicles would in this case only increase the potential safety risk and result in additional energy consumption. The vehicles should therefore be stopped, if possible, at a position where the other motor vehicles are obstructed as little as possible.

As described above, the method according to the invention is actually completed, after an adjustment of at least one trajectory has been determined and transmitted to the associated motor vehicle. If the vehicles follow the trajectories perfectly, no further adaptation of the trajectories is necessary. However, if a new conflict (or a new blockade) should nevertheless occur, then this conflict is recognized and a new exchange of the trajectories occurs and the conflict is resolved by adjusting the trajectory of at least one motor vehicle. Especially in complex driving situations, however, small deviations from the trajectory within short time intervals may lead to new conflict situations. If the method according to the invention is performed again each time in these situations, and if the arbitration device then potentially changes, then the employed rule set may also change. In some cases, different arbitration devices may therefore work against each other. Therefore, it is advantageous to monitor the execution of the driving operations of the trajectories, in particular by receiving the transmitted position data and/or sensor data after the at least one trajectory is adjusted by the arbitration device, and to adjust at least one trajectory, if at least one of the motor vehicles deviates from the associated trajectory, and to transmit the adjusted trajectory via the communication device associated with the arbitration device to the motor vehicle associated with the trajectory.

In this case, a change of arbitration device is avoided. Deviations from the trajectories can be corrected and the original plan expected to be successful in resolving the conflict will continue. It is particularly advantageous here when either sensor information or abstract environmental information is continuously transmitted to the arbitration device or when participating motor vehicles identify new, potentially relevant environmental data and transmit these data to the arbitration device.

In addition to the method, the invention also relates to a motor vehicle which includes at least one sensor and a communication device for vehicle-to-vehicle and/or vehicle-to-infrastructure communication, and a vehicle system, which is configured for participation in the described method. All statements regarding the method according to the invention can be applied analogously to the motor vehicle according to the invention.

BRIEF DESCRIPTION OF THE DRAWING

Further advantages and details of the invention will become apparent from the exemplary embodiments described below with reference to the drawings, wherein.

DETAILED DESCRIPTION OF PREFERRED EMBODIMENTS

Figure 1:
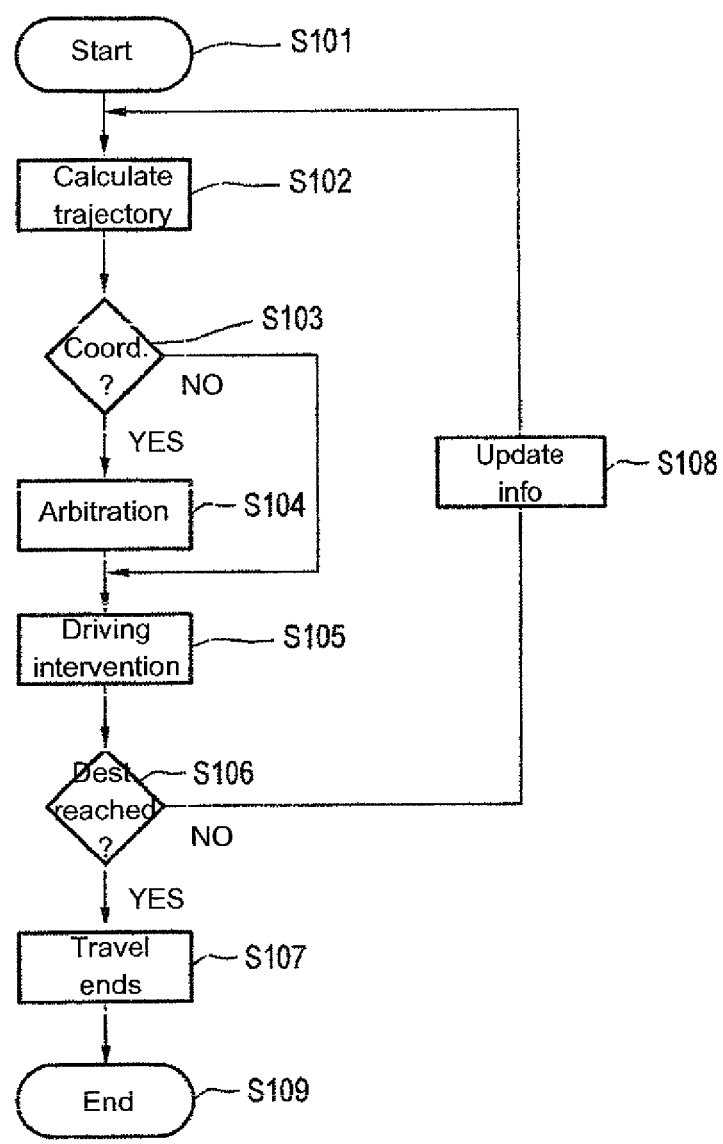
FIG. 1 shows a flow diagram of autonomous or fully automated driving with coordination.

FIG. 1 shows a flow diagram of driving autonomously or in fully automated mode with coordination. After the start of the process S101, a trajectory is first calculated for every motor vehicle in step S102. The vehicle system of the motor vehicle hereby uses environmental information describing the surroundings of the vehicle, and ego-information describing the condition of the vehicle including a destination in order to identify for the vehicle the most advantageous trajectory according to the existing information for reaching the destination. Since in the further course of the process, the trajectories can be coordinated, in this step a trajectory can also be determined that according to the environmental information cannot be executed without changing a position or a movement of at least one of the other motor vehicles predicted by the vehicle system. This is particularly useful in the case where a blockade situation exists, i.e. where the destination cannot be reached at least on a desired route, or in the case where the detected trajectory is particularly advantageous. The vehicle system can then, in addition to a trajectory calculated from the actual environmental information, also calculate trajectories that include the variations of the predicted trajectories of other motor vehicles and use such alternative trajectory when certain criteria, such as reaching the destination quickly, are satisfied significantly better than the normally determined trajectory. In this case, however, coordination is necessary, thus fulfilling the coordination condition in step S103.

In step S103, it is determined by the vehicle system whether a coordination of the movement of several motor vehicles should take place. Such coordination occurs in particular when another vehicle or a central facility has already initiated such a process. This is possible in particular in areas designed for the coordinated driving. In this case, the coordination can take place via a central facility of the area that initiates such a process. However, the vehicle system itself may also initiate such a process, for example, when entering an area designed for the coordinated driving, wherein however this area lacks a central facility or upon detection of a blockade condition. If driving movements are not to be coordinated, then process may be continued in step S105 by executing the driving interventions of the trajectory.

Otherwise a coordination of the trajectories is performed by arbitration in step S104. This will be described in detail later. When the trajectories of vehicles do not have conflicts, i.e. when there is no temporal and spatial overlap between the trajectories and the trajectories of all motor vehicles reach their respective destinations, the coordination involves exclusively the establishment of this fact. If there is a conflict between the trajectories, then the coordination results in arbitration and adjustment of the trajectory of at least one motor vehicle involved in the conflict. In step S105, the driving interventions of the trajectories are executed. After a predetermined time interval, it is checked in step S106 whether the destination of a motor vehicle has been reached. If this is the case, then travel is safely terminated in step S107 and the process is terminated in step S109. If the destination is not yet reached, the ego-information and environmental information of the motor vehicle are updated in step S108 and the process is repeated from step S102 on, wherein the trajectory must be newly determined only when the newly determined ego-information or environmental information shows that the previous trajectory is unfavorable.

Figure 2:
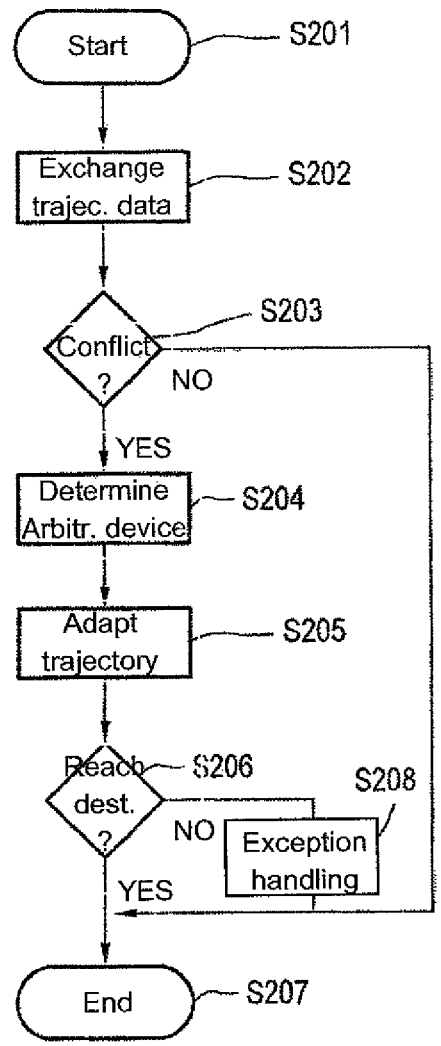
FIG. 2 is a flow diagram of the method according to the invention for coordinating the operation of motor vehicles that drive autonomously or in fully automated mode through arbitration.

FIG. 2 is a flow diagram of the coordination and arbitration step performed in step S104. After the start of the process S201, the trajectory data are exchanged in step S202. The trajectory data of the vehicles are in a defined format representing a time sequence of driving interventions, from which a local course of the trajectories can be easily determined. The exchange of the trajectory data takes place by the communication devices via direct vehicle-to-vehicle communication.

In step S203, it is checked by the vehicle systems of motor vehicles, whether there is a conflict between the trajectory of the own vehicle and the trajectories of the other vehicles transmitted in step S202. For this purpose, the distances between the trajectories are reviewed at each point in time. If the distance between the trajectories decreases to a value that is smaller than the size of the motor vehicle and a safety separation that may depend from the ambient conditions and the vehicle state, in particular the speed, then it is determined that a conflict between the trajectories exists. A conflict is detected even when the trajectory of a motor vehicle does not reach the corresponding destination. If no conflict exists, the process continues directly with step S207 and then ends. If a conflict exists between the trajectories, then this conflict shall be resolved by arbitration and by adjusting the trajectory of at least one motor vehicle involved in the conflict.

For this purpose, an arbitration device is first determined in step S204. In this exemplary embodiment, the vehicle systems of the motor vehicles involved in the conflict are used as arbitration devices. The determination, which of the vehicle systems is to be used, is made by evaluating a numerically interpretable identification of the vehicle system. This selection of the arbitration device may be changed by a priority signal, for example from a central facility or a support vehicle.

After the arbitration device has been determined, the trajectory at least one of the vehicles involved in the conflict is adapted in step S205 based on at least one arbitration rule. The arbitration rule is stored in the vehicle system that was selected as the arbitration device, or is loaded, for example, from a local central system or via the Internet. A number of arbitration rules exist for a variety of situations. The individual rules will be described here only as examples. Rules may include priorities for certain vehicles, resolve conflict situations through simple traffic rules, such as "right before left", and include general wayfinding algorithms. The set of rules of vehicles can be easily modified, for example to implement new wayfinding or control systems.

Subsequently, it is checked in step S206 whether the vehicles can reach their destinations by adjusting the at least one trajectory based on the at least one arbitration rule. If this is the case, the process ends in step S207, whereafter the driving interventions can be carried out (S105). If no adjustment of at least one trajectory, with the vehicles can reach their destinations, is made, then an exception handling is performed in step S208. Within the framework of exception handling, another arbitration device can be selected, a person can be alerted, or where no other solution to the conflict is possible, the vehicles are stopped.

Figure 3:
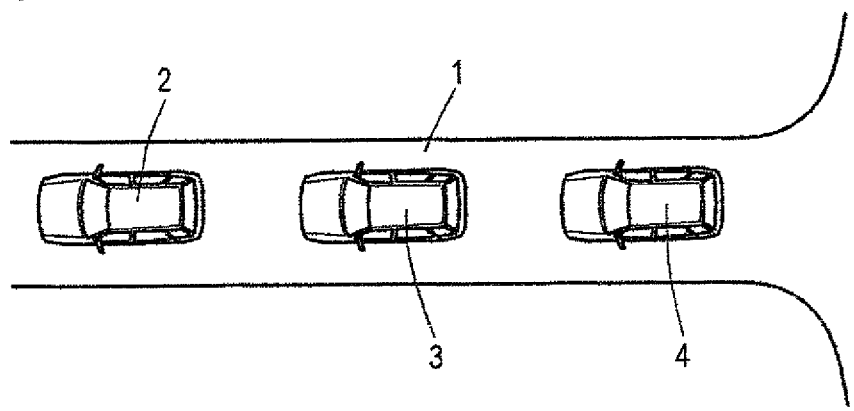
FIG. 3 shows a traffic situation for an exemplary embodiment of the method according to the invention.

FIG. 3 shows a traffic situation for an exemplary embodiment of the method for coordinating the operation of motor vehicles that drive autonomously or in fully automated mode. Here a motor vehicle 2 has become disabled on a narrow travel lane 1. Two other vehicles 3 and 4 are behind the disabled vehicle 2. The motor vehicle 4 does not detect that the motor vehicle 2 is disabled and therefore waits behind vehicle 3, since it should continue to move forward. The vehicle system of the motor vehicle 3 detects that this is a blockade situation, since no trajectory reaching the destination can be calculated for an extended period of time. In addition, the vehicle system of the vehicle 3 detects that the vehicle 2 is disabled and that forward trajectories are therefore not possible. Because a blockade condition exists, the vehicle system of the motor vehicle 3 determines a trajectory which in accordance with the environmental information cannot be executed without changing the position of the motor vehicle 4 and which is directed backwards.

With the presence of a blockade condition, the vehicle system of the motor vehicle 3 also initiates a coordination of the trajectories. First, an exchange of the trajectories occurs. The vehicle system of the motor vehicle 3 transmits with its communication device its own trajectory to the motor vehicle 4 and requests the trajectory of that motor vehicle. The trajectory of the vehicle 4 shows stoppage, the trajectory of the vehicle 3 driving backwards.

Therefore, there is a conflict between the trajectories of two motor vehicles which requires coordination between the vehicles. A decentralized network of the vehicle systems of motor vehicles 3 and 4 is determined as an arbitration device. Especially in driving situations, such as those illustrated here, where one maneuver is beneficial for all involved vehicles, arbitration can simply be performed by transmitting a desired trajectory. In this case, the motor vehicle 3 transmits to the motor vehicle 4 a request that the motor vehicle 4 moves backwards, as well as information that forward travel is not possible because the travel lane 1 is blocked by the disabled vehicle 2. The vehicle system of the motor vehicle 4 then analyzes the traffic situation, also confirms that forward travel is not possible and drives backwards. The conflict is thus resolved.

Figure 4:
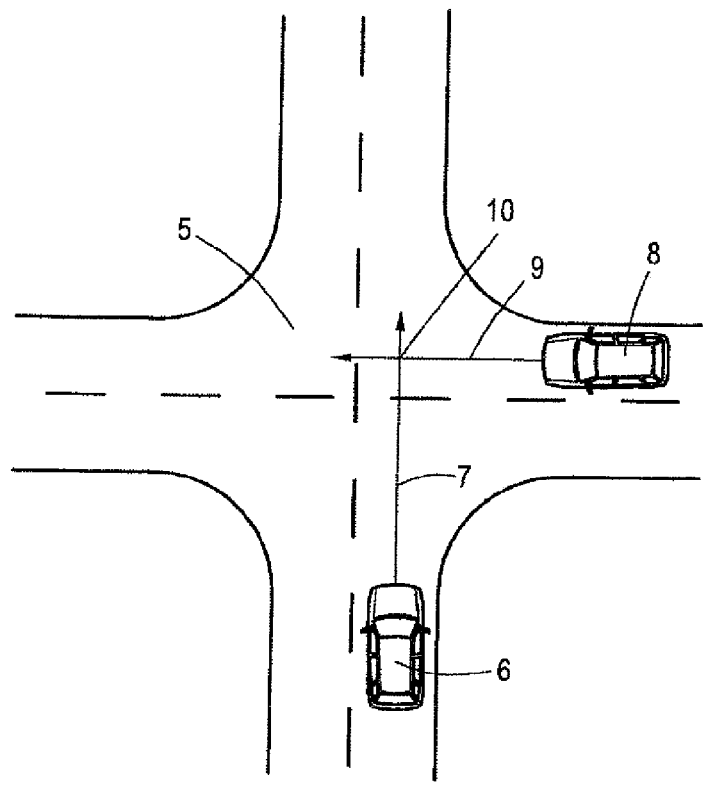
FIG. 4 shows another traffic situation for an exemplary embodiment of the method according to the invention.

FIG. 4 shows another traffic situation for an exemplary embodiment of the method for coordinating the operation of motor vehicles that drive autonomously or in fully automated mode. At an intersection 5, the motor vehicle 6 and motor vehicle 8 want to cross the intersection 5 at the same time. The vehicle systems of motor vehicles 6 and 8 recognize that driving straight-ahead is not possible due to the presence of the other motor vehicle, and determine in each case a trajectory that describes stoppage of the motor vehicles 3, 4. A blockade situation exists without an existing right of way. Both vehicles 3, 4 recognize this and each determine a trajectory 7, 9. Because these trajectories 7, 9 cannot be safely executed, a coordination condition exists. The trajectories 7, 9 are then exchanged and checked for conflicts by the vehicle devices of the motor vehicles 6, 8. If both vehicles 6, 8 follow their respective trajectories 7, 9, a conflict arises at the conflict point 10. The vehicle systems of the motor vehicles 6, 8 note this conflict and initiate arbitration.

In this exemplary embodiment, the arbitration device is a vehicle system and a unique numeric interpretable identification is assigned to each motor vehicle. The vehicle system serving as the arbitration device is selected by evaluating the numerical interpretable identification of the motor vehicle. Here, the motor vehicle 6 has the lower identification. The vehicle system of the motor vehicle 6 serves as the arbitration device. An arbitration rule derived from the general traffic rules is used which states that vehicles coming from the right have the right of way. Use of this rule will result in changing the trajectory of the vehicle 6. The trajectory is adjusted so that the motor vehicle 6 is first stopped until the vehicle 8 has crossed the intersection 5. The vehicle 6 then crosses the intersection 5.

It will now be assumed that the intersection 5 shown in FIG. 4 is located in an area designed for coordinated driving of motor vehicles that drive autonomously or in fully automated mode. In addition, the vehicle sensors of the motor vehicles 6 and 8 initially do not detect the respective other motor vehicle in the illustrated traffic situation. In this case, the motor vehicles 6, 8 will first determine the trajectories 7 and 9. However, since coordination between the vehicles always occurs in an area designed for coordinated driving, the trajectories 7, 9 are exchanged by the communication systems of the motor vehicles and a conflict between the trajectories 7, 9 at the conflict point 10 can be detected early. The conflict can then be easily resolved, as described above. In this case, however, the conflict can be resolved before both motor vehicles 6, 8 come to a stop. For example, when the conflict is identified in a timely fashion, the trajectory of the vehicle 6 can be adjusted so that the speed is only slightly reduced, which, however, still allows the motor vehicle 8 to pass the intersection before the motor vehicle 6 enters the intersection.

Figure 5:
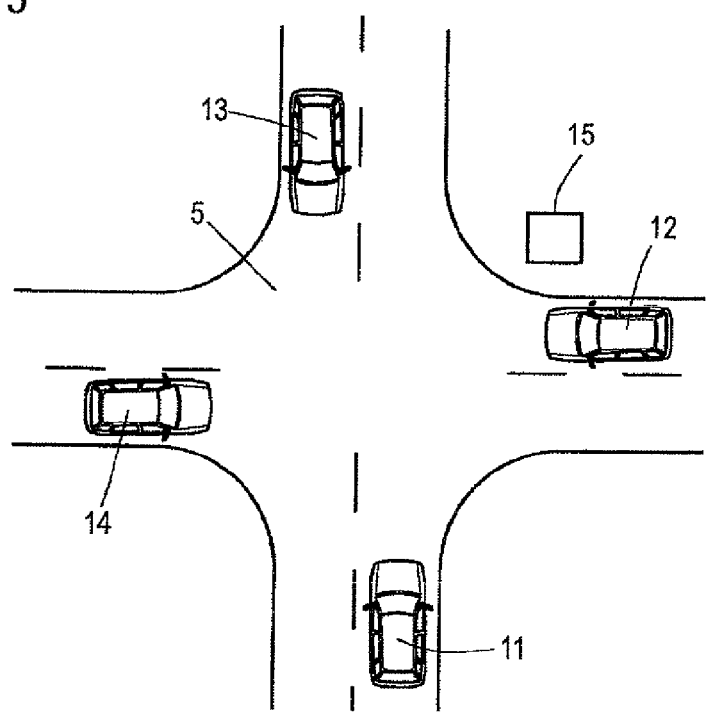
FIG. 5 shows a third traffic situation for an exemplary embodiment of the method according to the invention.

FIG. 5 shows a third traffic situation for an exemplary embodiment of the method for coordinating the operation of motor vehicles that drive autonomously or in fully automated mode. Four motor vehicles 11, 12, 13 and 14 that drive autonomously or in fully automated mode are now at the intersection 5. In this case, too, all motor vehicles want to cross the intersection 5 at the same time. Since this is not possible, the motor vehicles 11, 12, 13, 14 remain stopped and a blockade situation occurs. This is determined by the vehicle systems of the motor vehicles 11, 12, 13, 14, with each of the vehicle systems then determining a trajectory that describes driving straight through the intersection 5, wherein the vehicle systems then exchange these trajectories via the respective communication devices of the motor vehicles 11, 12, 13, 14. Since a conflict exists, an arbitration device must be determined.

Based on the identification of the motor vehicle 13, the vehicle system of the motor vehicle 13 is designated as the arbitration device. The vehicle system attempts here also to use the right-before-left rule used in the embodiment of FIG. 4. However, this arbitration rule cannot provide any solution for the conflict. Since the vehicle system of the motor vehicle 13 does not contain any additional arbitration rule for this traffic situation, another arbitration device, here is a central facility 15, is determined in the context of error handling. The central facility 15 resorts to an additional arbitration rule which allocates fixed priorities to the different roads leading to the intersection. The conflict can thereby be resolved.

Figure 6:
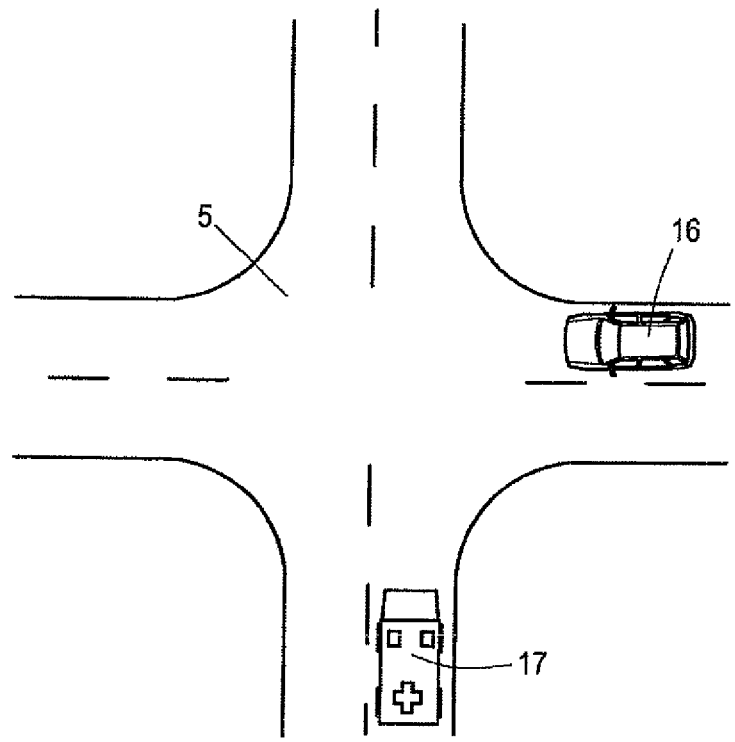
FIG. 6 shows a fourth traffic situation for an exemplary embodiment of the method according to the invention.

FIG. 6 shows a fourth traffic situation for an exemplary embodiment of a method for coordinating the operation of motor vehicles driving autonomously or in fully automated mode. The traffic situation is very similar to the traffic situation shown in FIG. 4. However, the motor vehicle 17 is an ambulance. Here, too, two motor vehicles 16, 17 want to cross the intersection 5 at the same time. A blockade is detected, trajectories are determined and transmitted, and an arbitration device is determined as described above. After evaluating the identification of the motor vehicles 16, 17, the vehicle device of the vehicle 16 is initially determined to be suitable as an arbitration device. However, the motor vehicle 17, the ambulance, sends a priority signal that overrides the original selection of the arbitration device and assigns the vehicle system of the motor vehicle 17 as the arbitration device. Since this is an ambulance, the arbitration rules used by the vehicle system of the motor vehicle 17 are different from the arbitration rules used in other vehicles. These are exclusively designed to enable the fastest possible travel of the ambulance while ensuring safety. The conflict is resolved here by determining with the vehicle device of the motor vehicle 17 a new trajectory for the motor vehicle 16 that states that the motor vehicle 16 initially stops, until the motor vehicle 17 has passed the intersection 5, and only then crosses the intersection 5.

Figure 7:
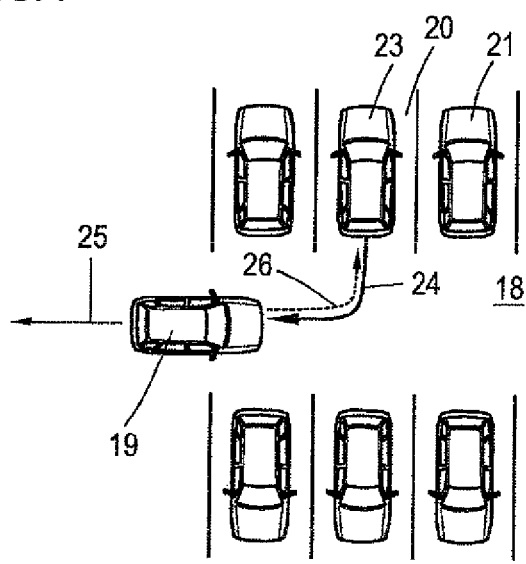
FIG. 7 shows a fifth traffic situation for an exemplary embodiment of the method according to the invention.

FIG. 7 shows a fifth traffic situation for an exemplary embodiment of the method for coordinating the operation of motor vehicles that drive autonomously or in fully automated mode. A motor vehicle 19 in search of a parking space 20 is detected in a parking garage 18. The motor vehicle 19 detects that the motor vehicle 23 leaves the parking space 20 and wants to park in parking space 20. Therefore, motor vehicle 19 determines a first trajectory, indicating a stop. The vehicle system of the vehicle 23 determines that the motor vehicle 19 is so close to parking space 20 that leaving the parking space with the trajectory 24 is not possible. Therefore, the motor vehicle 19 first determines a trajectory indicating a stop. The vehicle system of the motor vehicle 19 notes that this represents a potential blockade situation and initiates the coordination by transmitting its trajectory (stop) to the motor vehicle 23 and requests its trajectory (stop). Initially, a decentralized network consisting of the vehicle systems of motor vehicles 19 and 23 is determined as the arbitration device. In such a decentralized network, the vehicle system of one motor vehicle may transmit desired trajectories, i.e. trajectories to be performed by another motor vehicle, to the vehicle system of another motor vehicle. Here, the vehicle system of the motor vehicle 23 analyzes the traffic situation and determines a two-part desired trajectory for the motor vehicle 19, which is transmitted via the communication systems of the vehicles 19, 23.

The two-part desired trajectory is shown in FIG. 7. In the first part of the desired trajectory 25, the motor vehicle 19 looking for the parking space 20 should back up. It should then wait until the motor vehicle 23 has left the parking space 20, whereafter, in the second part of the desired trajectory 26, the motor vehicle 19 looking for the parking space parks in the parking space 20. The motor vehicle 23 could thus leave the parking space with this adapted trajectory.

The vehicle system of the motor vehicle 19 looking for a parking space 20 notes that the objective to park can be achieved with this trajectory. Thus, it accepts this trajectory and transmits this trajectory to the motor vehicle 23 leaving the parking space. The conflict is thereby resolved.

Figure 8:
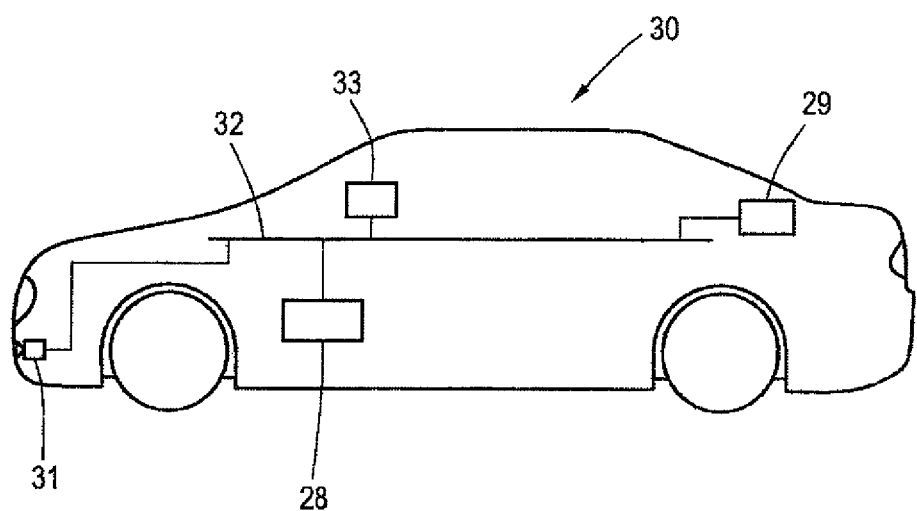
FIG. 8 shows a motor vehicle according to the invention.

FIG. 8 shows a motor vehicle with a vehicle system designed to participate in the process for coordinating the operation of motor vehicles that drive autonomously or in fully automated mode. The motor vehicle 30 includes a plurality of sensors, of which a camera 31 is shown as an example. These sensors communicate with a vehicle system 28 via a CAN bus 32. The vehicle system 28 uses the environmental information obtained from the sensors, such as the camera 31, as well as ego-information of the motor vehicle, such as a destination, to determine a trajectory. A variety of different strategies can be used to determine the trajectory. For example, it may be desired to reach the destination very quickly or in a particularly energy-efficient manner. The strategies may be selected automatically, for example randomly, or by using an operating element 33. If another vehicle is detected in the environment by one of the sensors, such as the camera 31, or through communication data received by the communication device 29, then the vehicle trajectory can be transmitted to the other vehicle via the communication device 29, if a coordination condition is satisfied. Communication between the vehicle system 28 and communication device 29 is also provided via the CAN bus 32. Alternatively, in areas designed for driving autonomously or in fully automated mode and where a central facility is provided for arbitration between motor vehicles 30, the trajectory information can be transmitted by the communication device 29 to this central facility. In addition, trajectory data of other motor vehicles can be received with the communication device 29 and transmitted to the vehicle system 28 via the CAN bus 32.

The vehicle system 28 is designed to check the received trajectory information for existence of a conflict between one own trajectory and one of these trajectories. Furthermore, information that such a conflict exists can be received from a central facility via the communication device 29.

The vehicle system 28 is configured to participate in an arbitration process. This participation may occur either as an arbitration device or be passive. If in the context of arbitration the vehicle system 28 is designated as the arbitration device, then it is configured to evaluate the trajectory of all vehicles involved in the conflict and all available ego-information and environmental information and to adapt at least one of the trajectories by applying an arbitration rule. If the adjusted trajectory is not the own trajectory, then the adjusted trajectory is transmitted via the CAN bus 32 to the communication device 29, and transmitted from there to the vehicle assigned to the trajectory. If the vehicle system 28 is not designated as the arbitration device, then the vehicle system 28 must only be able to evaluate and execute a proposed or prescribed trajectory received with the communication device 29.

What is claimed is:

1. A method for coordinating operation of motor vehicles driving in fully automated mode, comprising the steps of:
    determining with an on-board vehicle system for each motor vehicle a trajectory that is described by at least one driving intervention from vehicle-specific information describing a condition of the motor vehicle including a destination, and environmental information describing an environment of the motor vehicle,
    determining with the on-board vehicle system whether at least one coordination condition exists indicating that a trajectory of the motor vehicles has to be coordinated,
    when the at least one coordination conditions exists, performing the following steps:
        exchanging with an on-board communication device of each motor vehicle via a communication link trajectory data that describe the trajectory,
        checking the trajectories of the vehicles for conflicts that exist when the trajectories of at least two of the motor vehicles spatially and temporally overlap,
        when a conflict exists:
    adjusting the trajectory of at least one motor vehicle involved in the conflict based on at least one arbitration rule, which is evaluated by an arbitration device selected from the vehicle system of a motor vehicle involved in the conflict and a computing device, and transmitting the respective adapted trajectory via the respective communication device to the respective motor vehicle, and
    executing with each motor vehicle the at least one driving intervention described by the respective trajectory,
wherein the at least one coordination condition comprises determining with the vehicle system a blockade condition indicating a blockade, wherein when a blockade condition exists, the vehicle system is configured to determine a trajectory, which according to the environmental information cannot be executed without changing a position or a movement of at least one of other motor vehicles predicted by the vehicle system,
wherein the blockade condition represents a situation where within a predetermined time interval, a distance between the motor vehicle and the destination is never smaller than a smallest distance between the motor vehicle and the destination before a start of this predetermined time interval.

2. The method of claim 1, wherein the blockade condition comprises repeatedly determining over a predetermined period of time a trajectory that fails to reach the destination.

3. The method of claim 1, wherein the blockade condition represents a temporal or spatial deviation from an ideal trajectory which is greater than a predetermined temporal or spatial variation, wherein the ideal trajectory is calculated by disregarding at least one motor vehicle.

4. The method of claim 1, wherein the at least one coordination condition represents a presence of the motor vehicle in an area designed for coordinated driving, wherein the vehicle system is configured to determine the presence in this area in particular for using data of a device determining a position of the motor vehicle or of the communication device, or both.

5. The method of claim 1, wherein the arbitration device is the vehicle system of a motor vehicle involved in the conflict, and wherein the trajectory data of the at least one adjusted trajectory are transmitted via the communication device of the motor vehicle to each other motor vehicle associated with the trajectory.

6. The method of claim 5, wherein the vehicle system representing the arbitration device is determined randomly.

7. The method of claim 5, wherein the communication device of at least one of the motor vehicles transmits determination information for determining the vehicle system representing the arbitration device.

8. The method of claim 7, wherein the determination information comprises priority information.

9. The method of claim 1, wherein the arbitration device comprises or is connected to a communication device via a communication network and communicates with the communication devices of at least two motor vehicles, and wherein the trajectory data of the at least one adjusted trajectory are transmitted via this communication device to the motor vehicle associated with the at least one adjusted trajectory.

10. The method of claim 1, wherein the arbitration device is a decentralized ad-hoc network that includes the vehicle systems of the motor vehicles involved in a conflict, or that includes the vehicle systems of all vehicles.

11. The method of claim 10, further comprising determining with the vehicle system of at least one of the motor vehicles desired trajectories for at least one other motor vehicle, and exchanging the desired trajectories between the at least one motor vehicle and the at least one other motor vehicle over the decentralized ad-hoc network.

12. The method of claim 1, further comprising transmitting vehicle information via the communication device of at least one of the motor vehicles, wherein the vehicle information comprises at least one item of information selected from a position of the vehicle, the destination which the motor vehicle should reach, the destination which the motor vehicle should reach within a time window, driving option information describing possible driving maneuvers, and information assigning a priority to the motor vehicle, which are used as an input variable of the arbitration rule for adjusting at least one trajectory.

13. The method of claim 1, further comprising transmitting with the communication device of at least one of the motor vehicles at least one item of environmental information.

14. The method of claim 13, wherein the at least one item of environmental information comprises at least one determined position of a vehicle or of an obstacle.

15. The method of claim 1, wherein when the at least one trajectory based on the at least one arbitration rule for reaching the destinations of the vehicles cannot be adjusted, determining another arbitration device, wherein the other arbitration device is a vehicle system of a motor vehicle that has not yet participated in the arbitration process, or a central computing device operating as an arbitration device.

16. The method of claim 1, further comprising, after adjusting the at least one trajectory with the arbitration device,
monitoring execution of the driving interventions of the trajectories, and
when at least one of the motor vehicles deviates from an assigned trajectory, adjusting at least one trajectory and transmitting the at least one adjusted trajectory via the communication device associated with the arbitration device to the motor vehicle assigned to the at least one trajectory.

17. The method of claim 16, wherein execution of the driving interventions is monitored by receiving transmitted position data or by using sensor data, or both.

18. A method, for coordinating operation of motor vehicles driving in fully automated mode, comprising the steps of:
determining with an on-board vehicle system for each motor vehicle a trajectory that is described by at least one driving intervention from vehicle-specific information describing a condition of the motor vehicle including a destination, and environmental information describing an environment of the motor vehicle,
determining with the on-board vehicle system whether at least one coordination condition indicating that a trajectory of the motor vehicles is coordinated,
when the at least one of the coordination conditions exists, performing the following steps:
exchanging with an on-board communication device of each motor vehicle via a communication link trajectory data that describe the trajectory,
checking the trajectory of the vehicles for conflicts that exist when the trajectories of at least two of the motor vehicles spatially and temporally overlap,
when a conflict exists:
adjusting the trajectory of at least one motor vehicle involved in the conflict based on at least one arbitration rule, which is evaluated by an arbitration device selected from the vehicle system of a motor vehicle involved in the conflict and a computing device, and transmitting the respective adapted trajectory via the respective communication device to the respective motor vehicle, and
executing with each motor vehicle the at least one driving intervention described by the respective trajectory,
wherein when the at least one trajectory for reaching the destinations of the vehicles cannot be adjusted based on the at least one arbitration rule, activating an alarm device that notifies a person by a message by way of an acoustic signal or by a visual signal triggered by the message transmitted to a communication device via a communication network.

19. A method for coordinating operation of motor vehicles driving in fully automated mode, comprising the steps of:
determining with an on-board vehicle system for each motor vehicle a trajectory that is described by at least one driving intervention from vehicle-specific information describing a condition of the motor vehicle including a destination, and environmental information describing an environment of the motor vehicle,
determining with the on-board vehicle system whether at least one coordination condition indicating that a trajectory of the motor vehicles is coordinated,
when the at least one of the coordination conditions exists, performing the following steps:
exchanging with an on-board communication device of each motor vehicle via a communication link trajectory data that describe the trajectory,
checking the trajectory of the vehicles for conflicts that exist when the trajectories of at least two of the motor vehicles spatially and temporally overlap,
when a conflict exists:
adjusting the trajectory of at least one motor vehicle involved in the conflict based on at least one arbitration rule, which is evaluated by an arbitration device selected from the vehicle system of a motor vehicle involved in the conflict and a computing device, and transmitting the respective adapted trajectory via the respective communication device to the respective motor vehicle, and
executing with each motor vehicle the at least one driving intervention described by the respective trajectory, wherein when the at least one trajectory for reaching the destinations of the vehicles cannot be adjusted based on the at least one arbitration rule, stopping the motor vehicles involved in the conflict.

20. A motor vehicle comprising
at least one sensor,
a communication device for at least one of vehicle-to-vehicle and vehicle-to-infrastructure communication, and
a vehicle system configured to participate in coordinating operation of motor vehicles driving in fully automated mode, by:
determining with an on-board vehicle system for each motor vehicle a trajectory that is described by at least one driving intervention from vehicle-specific information describing a condition of the motor vehicle including a destination, and environmental information describing an environment of the motor vehicle,
determining with the on-board vehicle system whether at least one coordination condition indicating that a trajectory of the motor vehicles is coordinated,
when the at least one of the coordination conditions exists, performing the following steps:
exchanging with an on-board communication device of each motor vehicle via a communication link trajectory data that describe the trajectory,
checking the trajectory of the vehicles for conflicts that exist when the trajectories of at least two of the motor vehicles spatially and temporally overlap,
when a conflict exists:
adjusting the trajectory of at least one motor vehicle involved in the conflict based on at least one arbitration rule, which is evaluated by an arbitration device selected from the vehicle system of a motor vehicle involved in the conflict and a computing device, and transmitting the respective adapted trajectory via the respective communication device to the respective motor vehicle, and
executing with each motor vehicle the at least one driving intervention described by the respective trajectory,
wherein when the at least one trajectory for reaching the destinations of the vehicles cannot be adjusted based on the at least one arbitration rule, activating an alarm device that notifies a person by a message by way of an acoustic signal or a visual signal triggered by the message transmitted to a communication device via a communication network.

* * * * *